(12) United States Patent
Mancini

(10) Patent No.: US 7,606,764 B1
(45) Date of Patent: Oct. 20, 2009

(54) INSTALLMENT PURCHASE CARD AND RELATED SYSTEMS AND METHODS FOR MAKING INFORMED CONSUMER PURCHASES

(76) Inventor: Phillip Dominick Mancini, 5615 Gosling Dr., Clifton, VA (US) 20124

( * ) Notice: Subject to any disclaimer, the term of this patent is extended or adjusted under 35 U.S.C. 154(b) by 34 days.

(21) Appl. No.: 11/614,070

(22) Filed: Dec. 20, 2006

(51) Int. Cl.
*G06Q 40/00* (2006.01)
(52) U.S. Cl. .............................. 705/39; 705/17; 707/38
(58) Field of Classification Search .................... 705/14, 705/17, 35–36, 39, 42–43; 902/30–31; 725/5–6, 725/8; 283/21
See application file for complete search history.

(56) References Cited

U.S. PATENT DOCUMENTS 6,950,807 B2 * 9/2005 Brock .......................... 705/38

| | | | |
|---|---|---|---|
| 2002/0194122 A1 * | 12/2002 | Knox et al. .................... | 705/39 |
| 2003/0126036 A1 * | 7/2003 | Mascavage et al. ........... | 705/26 |
| 2004/0236652 A1 * | 11/2004 | Heiges et al. ................. | 705/35 |
| 2006/0149664 A1 * | 7/2006 | Smyth et al. .................. | 705/38 |

* cited by examiner

*Primary Examiner*—James P Trammell
*Assistant Examiner*—Chika Ojiaku

(57) ABSTRACT

Systems and methods for making installment based credit purchase. A consumer may access a network interface to see how a contemplated purchase will affect their existing obligations on the account under a variety of repayment options. When approving a purchase request from a retailer, the system will determine if the purchase qualifies for installment repayment based on price and type of product/service. If the purchase qualifies and if the consumer's account will support the purchase, the user will be presented with a variety of repayment options. The purchase will be authorized at the selected repayment option.

18 Claims, 9 Drawing Sheets

FIG. 8

If you purchase the 50 inch Plasma TV from retailer X you can repay it under the following scenarios:

1) $229.17 per month for 12 months

2) $115.63 per month for 24 months

3) $77.78 per month for 36 months

Under your present obligations you would pay the following under options 1)-3)

1) $327.17 per month with $170.83 of remaining monthly credit limit (click here to view)

2) $215.63 per month with $284.37 remaining monthly credit limit (click here to view)

3) $177.78 per montn with $322.22 remaining credit limit (click here to view)

close this window

INSTALLMENT PURCHASE CARD AND RELATED SYSTEMS AND METHODS FOR MAKING INFORMED CONSUMER PURCHASES

FIELD OF THE INVENTION

The invention relates generally to card-based financial transactions and more particularly to an installment-type credit instrument and systems and methods for making informed consumer purchases with an installment-type credit instrument both at the point-of-sale and over electronic communication networks.

BACKGROUND OF THE INVENTION

There is a financing gap between expensive durable goods such as cars, boats and other titled goods and not titled consumer goods that are still relatively expensive compared to daily consumption items. To a large extent, at least in America, this gap is filled by credit cards. Credit card use has become ubiquitous in American society. Credit card acceptance has become nearly universal in America, and in fact, much of the world over, with even small, independent retailers being forced to accept many credit cards to compete with their larger competitors.

Credit card companies aggressively market credit cards to college students and also at sporting events, shopping centers, and other high density locations in order to get consumer to apply for new credit card accounts. Various incentives including physical collateral (i.e., towels, tee-shirts, souvenirs, etc.) as well as low interest introductory rates and/or balance transfer programs are used to entice customers to apply for credit cards. As a result, excessive credit card debt has become a serious problem causing many Americans to suffer from bad credit, inability to save, living paycheck to paycheck, and in the worst case failing to meet even their fixed costs due to the high interest payments required to service their credit card debt.

Innovations in the credit industry have primarily been aimed at increasing revenues for the credit card companies at the expense of their cardholders, rather than benefiting them or even incentivizing them to be more financially responsible. One current innovation in the credit industry is affiliation cards. These cards have school logos, professional sports team logos, organization logos, and even customer supplied photos printed on them. Thus, the consumer ostensibly enjoys some satisfaction from having a credit card with a graphic image of their choice on it, thereby allowing the consumer another outlet to express their individuality and affiliations. However, other than the look of these affiliation credit cards, they function just as any other revolving debt instrument and thus are no less likely to help the card holder live a more financially responsible lifestyle.

Another innovation in the credit card industry has been stored value cards. Stored value cards are debit cards that are either purchased with a fixed declining balance or have no value initially and receive their value from another source such as the purchaser's checking account or other credit card. Stored value cards are attractive to credit card companies because there is essentially no risk for the issuer because they are prepaid and a certain, significant percentage of them are never used, thereby providing a windfall gain to the issuer. These cards do not provide the consumer with credit at all, but rather a way to access money that they already have. The primary benefit of these cards to the consumer is that they provide a way to carry money that is more secure than cash and accepted at most if not all places that accept credit cards.

Still another innovation in the credit card industry has been reward card programs. Reward card programs typically provide the consumer some sort of rebate based on purchases made with the card. Often these cards are affiliated with a third party such as an airline, hotel, or retailer, or partnership comprising several of these entities. Rewards inure in the form of miles, points, discount credits, etc. Alternatively, the consumer may receive a dollar rewards such as a check, a credit in a college savings account, or a dollar amount to spend in a reward catalog provided by the credit card company. While these type of credit card programs are beneficial to the consumer to the extent that they are receiving a benefit, that is a return of a portion of the transaction and interest fees paid by them and generated by their purchasing activity, they still don't incentivize the consumer to spend money responsibly. To the contrary, these programs may actually induce irresponsible spending behavior because the consumer may feel less concern about spending money with their card because of the benefit they are receiving, regardless of their ability to repay the expenditure.

Thus, there exists a need for a financial instrument and payment processing system that provides consumers with the convenience of universal card acceptance while ameliorating some or all of the above-noted shortcomings of conventional credit systems.

SUMMARY OF THE INVENTION

Accordingly, in view of the foregoing, various embodiments of the invention may provide a financial instrument that is based on a fixed interest installment repayment plan.

Various embodiments of the invention may provide a financial instrument that allows a user to view the effect of a contemplated purchase on the consumer's existing financial obligations on the account associated with the instrument.

Various embodiments of the invention may provide a method of facilitating an online transaction by providing a link on a retailer's website that takes a consumer to a financial account associated with the consumer, presents the consumer with a repayment scenario that shows the effect of the contemplated purchase vis-à-vis any repayment obligations already undertaken by the consumer, and allows the consumer to return to the retailer's website to consummate the transaction if so desired.

Various embodiments of the invention may provide a terminal in a retail outlet to permit a consumer to log on to an account associated with their card and to determine the effect of a contemplated purchase on their existing repayment obligations.

Various embodiments of the invention may provide a method of facilitating a transaction comprising presenting a consumer with a plurality of different repayment terms and permitting the consumer to select a desired repayment plan at the point-of-sale.

Various embodiments of the invention may provide a method of facilitating a transaction comprising presenting a consumer with a plurality of different repayment terms and permitting the consumer to select a desired repayment plan in an online purchase transaction.

Various embodiments of the invention may provide a method of performing an installment purchase with a credit instrument comprising determining if a purchase includes a product having a price that qualifies for installment repayment, determining if a purchase includes a type of product that qualifies for installment repayment, and approving the purchase under a installment repayment plan if the product qualifies.

Various embodiments of the invention may provide a financial instrument that permits user to select between a credit purchase and an installment purchase at the time of purchase.

Various embodiments of the invention may include generating a repayment plan schedule including any existing repayment obligations of the consumer when the consumer makes a new purchase and sending the repayment plan to the consumer.

Accordingly, at least one embodiment of the invention may provide a method of making an installment based purchased. In this embodiment an installment transaction instrument is provided that is adapted to permit a customer to make purchases at retail points of sale and to pay for the purchases of qualifying goods over one or more predetermined or consumer selected repayment periods.

Another embodiment of the invention may provide a dual purpose transaction card having a credit or debit feature as one purpose and an installment feature as a second purpose, wherein, when a consumer tenders the card for purchases the consumer is prompted at a transaction terminal to select a mode of payment from credit/debit or installment, if a current purchase qualifies for installment repayment in terms of the dollar amount of the purchase and the type of good(s) purchased. In various embodiments, when the user selects installment, the user is prompted to select a repayment period from a plurality of different repayment periods. In various embodiments, the user may select a repayment plan based on a proposed monthly payment amount from a plurality of different proposed monthly payment amounts.

An additional embodiment of the invention provides an Internet website adapted to provide a user application to facilitate an installment card credit application process. The installment card credit application process is characterized in that an application uses the application to input personal information including identification information and existing financial payment information to determine a feasible maximum monthly payment amount for a new financial obligation related to an installment card.

Still a further embodiment of the invention provides an installment credit card approval process that determines a feasible maximum monthly payment amount based at least on part on a combination of an applicant's credit report information, an applicant's existing monthly financial commitments and an applicant's monthly income level.

Still a further embodiment of the invention provides an installment credit card approval process that determines a feasible maximum monthly payment amount based at least in part on a agreement by the applicant to transfer a predetermined amount of savings into a savings account each month, wherein monthly payments for any installment purchase are taken automatically from the savings account.

Yet another embodiment of the invention provides an network-based installment credit card computer system that enables a user to determine the impact of a purchase the user is contemplating making with his installment card on the user's monthly payment prior to making the purchase. In various embodiments, the user can determine the impact by accessing an Internet website or other network location affiliated with the installment card issuer, and logging into contemplated purchase interface, whereby the user may enter an amount of a contemplated purchase, and the user is presented with at least one repayment scenario that includes any existing obligations on the user's installment card account.

In various embodiments, the user can determine the impact by sending a text message to a number affiliated with the installment card issuer, the text message including the contemplated purchase amount. In various embodiments, the user will receive a return text message including at least one repayment scenario that provides a monthly payment amount to payoff the contemplated purchase in a specified number of months and including any additional monthly payment obligations attributed to past purchases made with the installment card.

In yet one more embodiment of the invention, an installment card credit approval process is provided. The installment card credit approval process according to this embodiment differs from conventional credit card approval processes in that the applicant is approved for a maximum monthly payment rather than a maximum credit limit.

In another embodiment, a retail store kiosk is provided for enabling a purchaser to consider a possible purchase. In various embodiments, the kiosk will include a card reader, biometric reader or other identification input interface to identify the consumer and his corresponding account. In such embodiments, the consumer may enter a SKU number or select an item from an electronic catalog or simply enter the purchase price, and be presented with one or more repayment scenarios that illustrate how the contemplated purchase will affect the purchasers' existing installment account under a variety of payoff scenarios.

In yet another embodiment, the installment card, on a reverse side, will comprise a table with a range of pay off values and scenarios. For example, $500 to $5000 in increments of $50 for 1, 2 and 3 years.

In still an additional embodiment, an electronic link may be provided on a retailer's website whereby a customer viewing price and description information on a particular product can select the link and be taken to a website in a new browser window that enables the customer to see what the affect of the purchase of that item would be on the customer's existing installment card account under a variety of different scenarios, including an additional monthly payment amount, a total monthly payment amount and a payoff date. In various embodiments, information corresponding to the purchase including the price and type of item will be automatically provided to the website by programming associated with the link. In various embodiments, the interface accessed by the customer will not allow the consumer to make any financial obligations on the account, but rather to test contemplated purchases.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 8 is an exemplary repayment scenario page including a plurality of repayment scenarios for a particular contemplated purchase according to at least one embodiment of the disclosure.

DETAILED DESCRIPTION OF THE DISCLOSURE AND PREFERRED EMBODIMENTS

Figure 1:
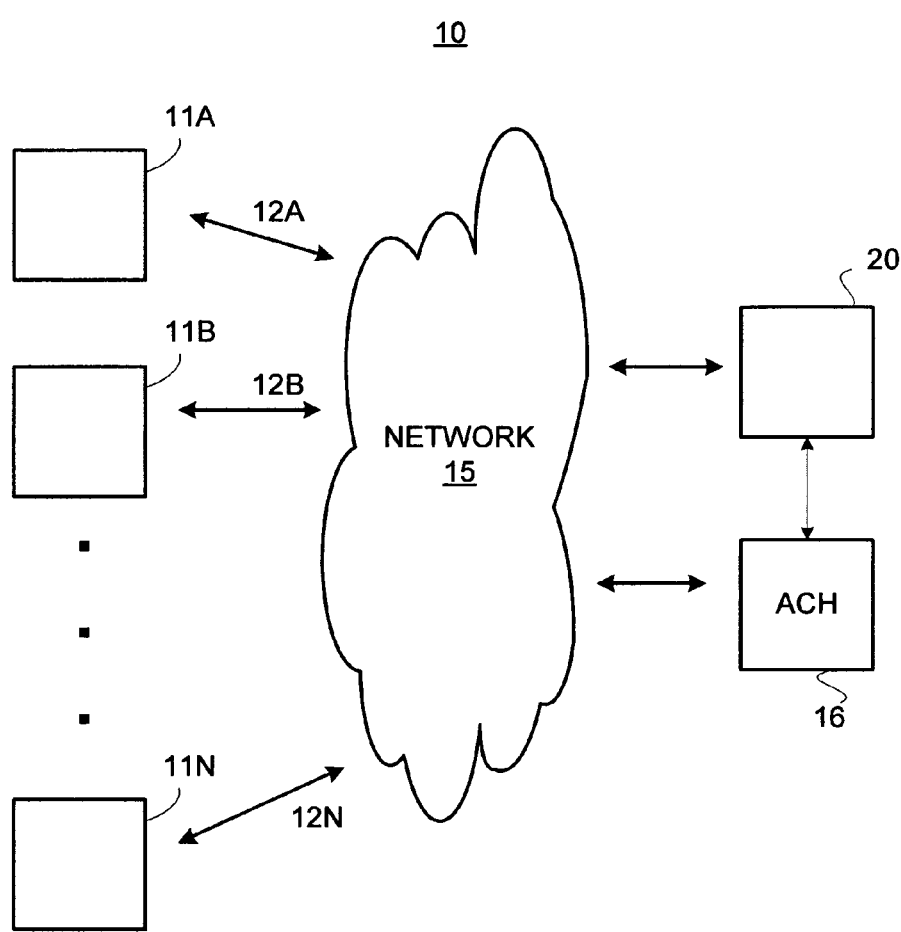
FIG. 1 is a diagram of an exemplary system for making informed purchase decisions with a installment-based credit instrument according to at least one embodiment of the invention.

The following description is intended to convey a thorough understanding of the embodiments described by providing a number of specific embodiments and details involving installment-based financial instruments and systems and methods for making informed purchase decisions with installment-based financial instruments. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As noted above, credit card debt has become a serious problem for many American consumers. Obtaining credit is extremely easy and instant incentives, prizes, etc. are often offered simply for applying for credit cards. Retailers may exacerbate this problem by advertising products at a minimum monthly payment, often assuming interest only payments at the best interest rate of a range of rates available. These repayment terms advertised by retailers often take decades for repayment by making these types of minimum payments. Consumer's are duped into believing that they can buy a $1500 television set for $19 a month. They are also duped into believing that they are actually "financing" the purchase under the advertised terms. However, these advertised terms typically assume that the consumer will apply for a credit card associated with the retailer and will put the entire balance of the purchase on that card. After making several such purchases that may only have a combined minimum monthly payment of $100 the consumer may find his/herself with several thousand dollars of credit card debt, and in some case more than $10,000 worth of debt. In addition, the consumer may have a plurality of different credit card accounts, each associated with a different retailer. This may reflect badly on the consumer's credit record and may also unnecessarily complicate the consumer's financial life.

In addition to aggressive and often misleading marketing techniques by card issuers and retailers, a main reason that consumers find themselves in credit card debt is that they aggregate all their purchases regardless of type. As noted herein, reward programs encourage this type of behavior—putting everything on a single card. Instead, various embodiments of the invention, encourage consumers to separate their purchase behavior into consumption and capital asset purchases.

Consumers tend to use credit cards for two types of purchase. Once type is simply consumption. This includes goods that are consumed each month such as gasoline, food, dinners out, and monthly discretionary purchases for items such as clothes, music, movies, etc. These types of purchases should be paid each month and not carried on a credit card beyond the month in which they are incurred. Thus, unless they are being paid in full, the consumer is likely to get deeper into debt each month just from consumption.

The second type of purchases are capital asset purchases. These types of purchases are for durable goods that the consumer will derive utility from for a period usually extending into several years. These type of goods are usually relatively expensive compared to consumption goods. Such goods may include television sets and other appliances, equipment, sporting goods, home products and services such as central air conditioning units and furnaces, roofing, replacement windows and other large ticket items. Purchase of capital assets maybe made intentionally, that is as planned purchases, or they may be made in an emergency, such as when an existing appliance, roof, HVAC unit, etc., fails, leaving the consumer with no other choice but to replace the item.

A problem comes when the user mixes these capital asset purchases that can not be paid in a single billing period, on a credit card with consumption purchases. Even if the consumer is able to pay off the consumption amount of a credit card bill each month, they are being charged an average daily balance on the total. Thus, they start paying interest on their consumption even if they are paying the consumption portion off each month.

Thus, various embodiments of the invention provide a mechanism to separate capital asset purchases from consumption purchases and allow the consumer to repay the capital asset purchases using a simple interest repayment model. Various embodiments also allow the consumer to perform "what if" type analysis with respect to their existing purchase obligations, that is, to various different repayment options for a contemplated purchase, given their existing repayment obligations for past purchases.

Referring now to FIG. 1, FIG. 1 is a diagram of an exemplary system for making informed purchase decisions with a installment-based credit instrument according to at least one embodiment of the invention. The exemplary system 10 depicted in FIG. 1 includes a plurality of terminals 11A, 11B, 11C, . . . 11N. Each terminal 11A, 11B, 11C, . . . 11N may comprise a traditional brick and mortar retailer, a service-type business, an online retailer, and/or a user computer, communication device, personal digital assistant, wireless phone, or other device, that is, the terminals 11A, 11B, 11C, . . . 11N may comprises mixtures of these devices. These devices 11A, 11B, 11C, . . . 11N are in communication with a communications network 15 via respective network connections 12A, 12B, 12C, . . . , 12N. These network connections may be local area wireless networks, twisted-pair telephone networks, or other suitable interface networks providing the "last mile" connection to network 15. The network 15 may be a single network, such as a distributed wide area network (WAN) like the Internet. The network 15 may also include a variety of smaller networks that connect together to make a bigger network such as optical networks, public switched telephone networks (PSTNs), satellite networks, etc.

The system 10 may also include an automated clearing house 16 used in the case of retailer purchase requests to provide credit/debit authorization for retailers from a variety of different banks and card issuing entities, as is known in the art. In addition, the system may include an installment card processing server system 20. The installment card processing system 20 may be in direct communication with the automated clearing house 16 and may also be accessible by any of the terminals 11A, 11B, 11C, . . . , 11N via the network 15.

In various embodiments, as is discussed in greater detail herein, consumers may interact with the installment card processing server system 20 in order to make informed purchase decisions. For example, consumers may access installment card processing server system 20 to view the affect of contemplated purchase decisions on their monthly payment given their existing repayment obligations. This may be done by dialing in, text messaging, emailing, connecting via a web browser on the consumer's computer, clicking on a link located on an online retailer's product web page, connecting via kiosk in a retail outlet, or at a point-of-sale terminal. In various embodiments, consumers may interact with the installment card processing server system 20 to determine see the affect of a contemplated credit purchase will be on their existing obligations under a plurality of repayment plans.

Also, in a purchase transaction, whether online or at a traditional brick-and-mortar retailer, the seller may, via one of the terminals 11A, 11B, . . . , 11N contact the ACH 16 to receive authorization for a purchase via the network 15. Alternatively, the seller may contact the installment card processing server system 20 directly via the network 15. In the former case, the ACH 15 may direct the request to the installment card processing server system 20 and server as a proxy there between. Otherwise, the installment card processing server system 20 may handle the request directly. In such cases the installment card processing server system 20 may first identify the consumer's account based on information in the request, determine if the transaction qualifies for installment repayment and if so, provide one or more installment repayment options which are sent back to the requesting retailer and displayed on a terminal that is viewable by or presented to the consumer. The consumer may select one of the options and the transaction will be authorized and billed to the consumer's account in accordance with the selected terms.

Figure 2:
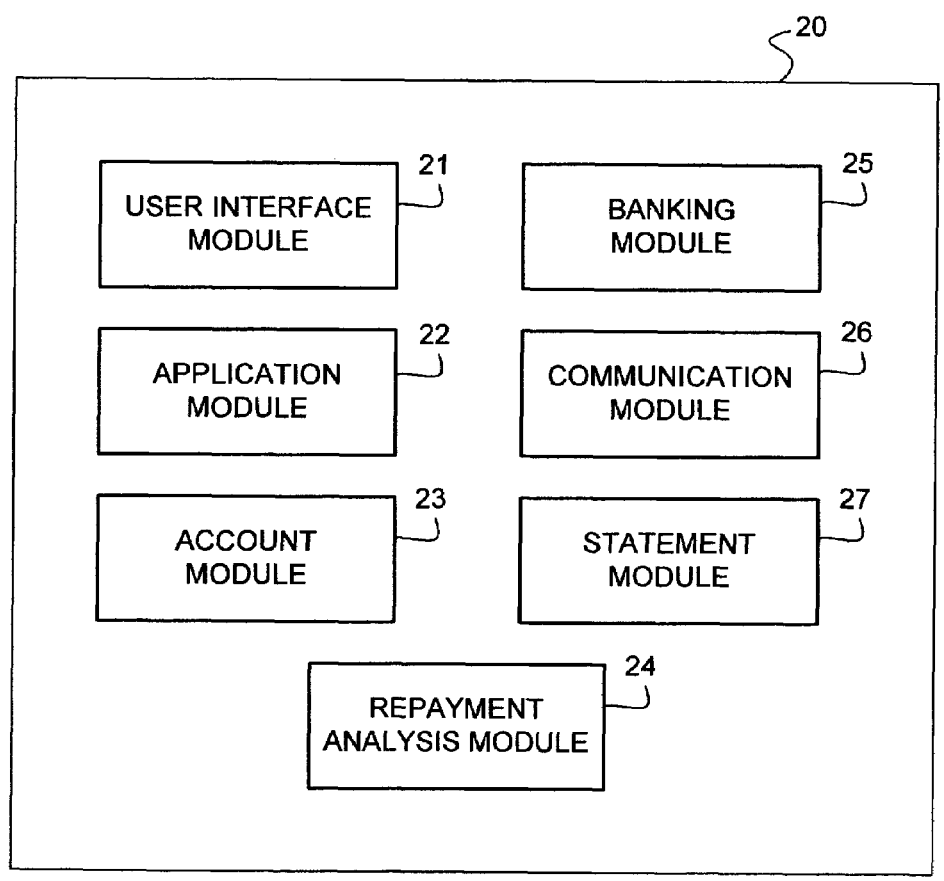
FIG. 2 is a block diagram of a credit instrument processing system that facilitates informed, installment-based purchase transactions according to at least one embodiment of the invention.

Referring now to FIG. 2, this Figure depicts a block diagram of an installment card processing server system 20 that facilitates informed, installment-based purchase transactions according to at least one embodiment of the invention. The exemplary system 20 depicted in FIG. 2 comprises a plurality of modules including a user interface module 21, an application module 22, an account module 23, a repayment analysis module 24, a banking module 25, a communication module 26, and a statement module 27. It should be appreciated that although in various embodiments, each module may comprise components of a software-based program, each module may also be configured as separate software applications executing on computer hardware, one or more application specific integrated circuits (ASICs), a combination of hardware and software, separate computers or computer components, one or more web servers, databases and/or other suitable configuration(s). Moreover, one or modules may be combined or broken into multiple additional modules. Also, additional and/or different modules than those shown in FIG. 2 may be utilized with various embodiments of the invention. Furthermore, although the modules of system 20 are depicted as if located in a single location, structure, and/or facility, one or more of them may be distributed an in communication with one another over a public or private network.

The user interface module 21 may include a web server or other network interface adapted to receive requests from consumers, that is card holders and card applicants and also may receive requests from retailers and/or automated clearing houses for transaction approval. The user interface module 21 may include a plurality of application program interfaces (APIs) for communicatively interfacing with various systems including web browsers, messaging systems, ACH EDI systems, etc. In various embodiments, the user interface module 21 may serve as the first point of contact for both users' and retailers/ACHs trying to obtain authorization for a purchase transaction.

The application module 22 may be used by would-be card holders to facilitate an interactive credit application process, in conjunction with the user interface module 21. For example, the consumer may be prompted to enter information identifying the consumer, including name, address, social security number etc. The application module 22 may invoke the communication module 26 to pull a credit record associated with the consumer and/or to obtain other data from external systems. The application module 22 may, either based on the consumer's credit record, the consumer's income, or for any other reason may determine a maximum monthly payment amount that the applicant consumer is approved for. The consumer may be approved outright. Alternatively, the consumer may be prompted to determine if the consumer would agree to automatic monthly withdrawals from an account of the consumer to a savings account with the card issuer of the system 20. These withdrawals may be equivalent to the amount of the maximum monthly payment or may be a fraction of the maximum monthly payment. Also, payments towards any purchases made on the account approved for the applicant may be made directly from the savings account. In various embodiments, if the applicant is approved, and agrees to any stipulated terms, the application module 22 may invoke the account module 23 to create an account for the applicant in accordance with any stipulated terms.

The account module 23 may be used to maintain all current and historical information associated with a particular user account. For example, when a user accesses the system 20 to contemplate a purchase, after identifying his/herself either automatically (i.e., by card swipe) or by keying in an identification, the user interface module 21 may invoke the account module 23 and the repayment analysis module to determine one or more repayment scenarios for the contemplated purchase. The account module 23 may supply information corresponding to all existing repayment obligations on the account as well as the account limits (e.g., maximum monthly payment) and account status (current, default, etc.). The repayment analysis module 24, based on the amount of the requested purchase and the interest rate specified by the account module 23, may determine one or more repayment scenarios, such as 1 year, 2 years and 3 years, that provide a monthly payment for the current purchase as well as a monthly payment that includes any previous repayment obligations on the account. This information may be presented to the consumer via the user interface module 21 and the communications module 26.

As another example, if a retailer is contacting the system 20 to seek approval for a purchase transaction, an automated request may be received by the user interface module 21. The automated request may include an account identifier for the consumer as well as information corresponding to the requested purchase such as dollar amount, a code identifying the retailer (North American Industry Classification System or NAICS code), and a code, description and/or classification of the good being purchased. In various embodiments, either the user interface module 21 or the repayment analysis module 24 will determine initially if the purchase is a purchase that qualifies for installment repayment. This may include determining if the purchase exceeds a certain minimum dollar amount, for example $750, and if the purchase is for a good or service for which installment purchases can be made. For example, certain types of businesses may be excluded—restaurants, clothing stores, grocery stores, etc. in order to further encourage responsible spending and to reinforce the notion of separating capital asset purchases from consumption purchases. If the requested purchase does qualify, the system 20 may then invoke the repayment analysis module 24 to determine one or more repayment plans for the purchase taking into account the consumer's existing repayment obligations in the account module 23. This information may then be transmitted back to the requesting retailer by the user interface module 2 via the communication module 26. In various embodiments, the consumer may be approved for all repayment options so that it is not necessary to re-contact the system 20 except provide evidence that the transaction was in fact completed. This may be reconciled with the account module 23 in real time, or in batch mode at a later date by one or more ACH systems.

The banking module 25 may be used to reconcile all financial accounts. This is, the banking module 25 may transfer monies into the account module 23 to pay towards user's accounts and to make automated savings account deposits. The banking module 25 may also be used to pay out monies to requesting retailers in response to consumer purchases.

The communications module 26 may comprise a communication server, a network interface card and/or hub, switch, or other suitable equipment. The communications module 26 may comprise an multiple interfaces to multiple communications networks including telephone networks and packet-based networks.

The statement module 27 may generate statements each time a transaction is approved. For example, if a user selects a particular installment repayment plan for a particular purchase, the statement module 27 may create a textual and/or graphical statement that illustrates the transaction and corresponding repayment plan including any existing financial obligations. The statement module 27 may then automatically send a statement to the consumer based on preference stored in the account module. For example a paper statement may be mailed to an address specified by the consumer at the time of account creation. Alternatively, the statement may be emailed to an email account of the consumer, or stored in an electronic mailbox at the system 20 that can be accessed on demand by the consumer via the user interface module 21.

Figure 3:
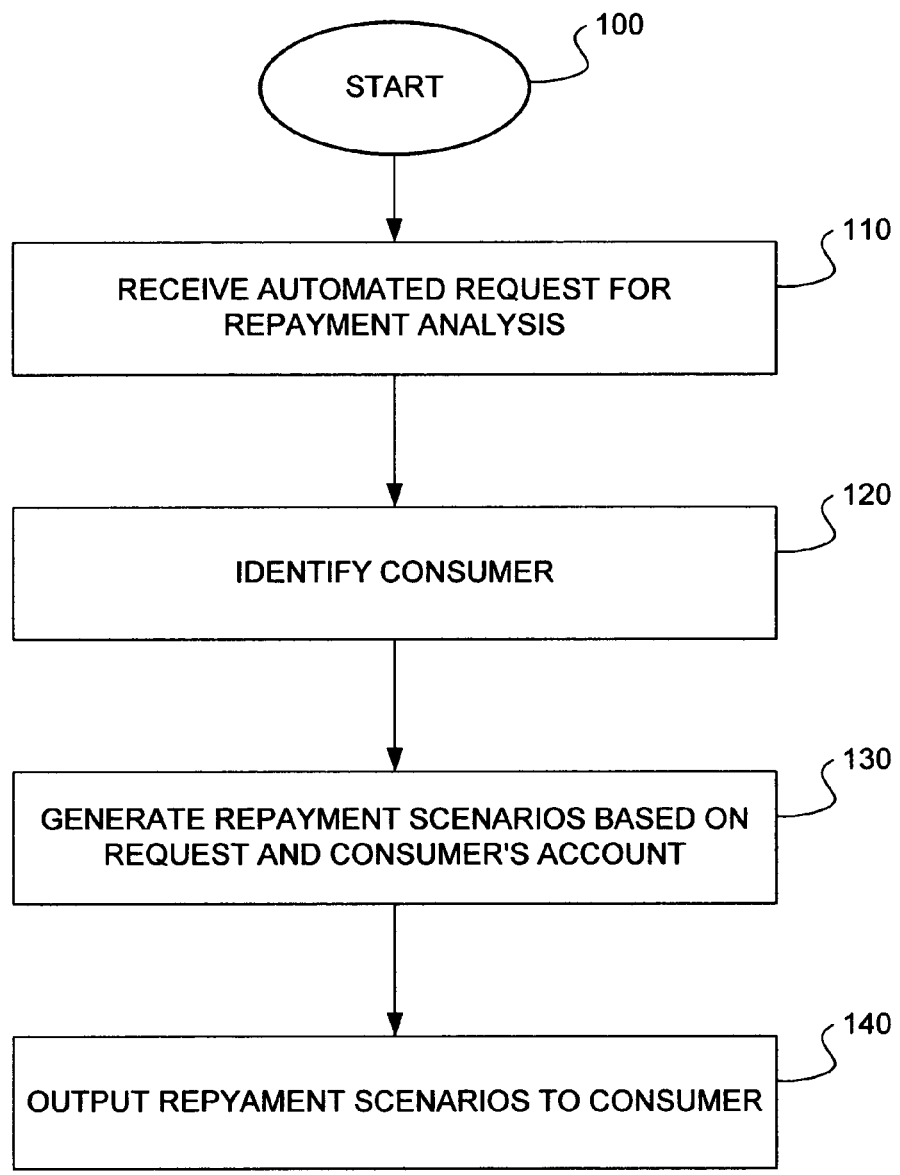
FIG. 3 is a flow chart of an exemplary method for making an informed purchase decision according to at least one embodiment of the invention.

Referring now to FIG. 3, this Figure is a flow chart of an exemplary method for making an informed purchase decision according to at least one embodiment of the invention. The method begins in block 100. In block 110, an automated request for repayment analysis is received by the server system. In various embodiments, this may comprise receiving a request from a user such as from a communication device of the user, a computer of the user, in kiosk in a retail outlet, or a hyperlink on a retailer's product description webpage. In various embodiments, the request will include at least a dollar amount of the contemplated purchase. This information may be transmitted automatically, such as if the consumer is merely clicking on a link provided on a retailer's web site. Alternatively, the dollar amount may be entered by the consumer.

In block 120, the consumer is identified. In kiosk-based application, this may be done by waving or swiping an ID card, or supplying a biometric input (e.g, finger print, retinal scan, voice recognition pattern, etc.). In mobile phone based applications this may be done by referencing the device number if this number has been associated with the user. In applications where the user is simply accessing a server system associated with the card issuer, the user may enter his own identification information as a means of "logging in." Also, if the user is on a website of a retailer, the consumer may be prompted to manually supply this identification information as shown in greater detail in the context of FIGS. 6 and 7. Identifying the consumer may also comprise accessing a user account associated with the consumer.

In block 130, one or more repayment scenarios may be generated for the consumer based on the amount of the contemplated purchase and information corresponding to existing purchase obligations in the consumer's account. In various embodiments, this may be done using default repayment criteria such as 1, 2 and 3 year repayment periods, as well as account specific information, such as interest rates. The interest rate may also vary for each repayment period.

In block 140 the one or more repayment scenarios may be output the requesting consumer. This may comprise outputting them to a window of a web browser client used by the consumer to access the system, sending a message to a phone or email account, sending a message to a kiosk, or displaying the message on a point-of-sale terminal.

Figure 4:
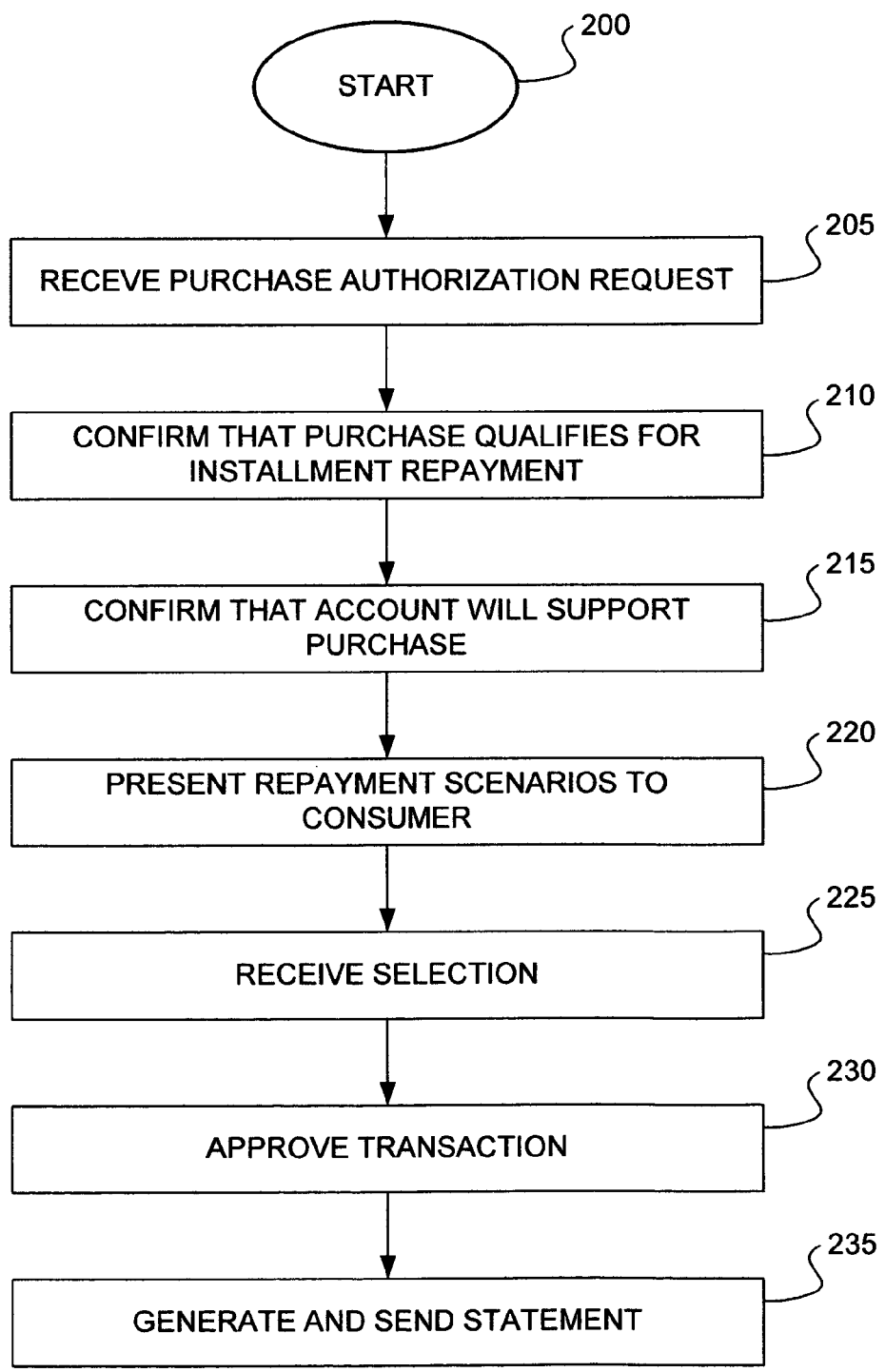
FIG. 4 is a flow chart of an exemplary method for conducting a transaction based on an informed purchase decision with an installment instrument according to at least one embodiment of the invention.

FIG. 4 is a flow chart of an exemplary method for conducting a transaction based on an informed purchase decision with an installment instrument according to at least one embodiment of the invention. The method begins in block 200. In block 205, a request for purchase authorization is received. As noted herein, this may be from a traditional retailer's credit authorization terminal and/or cash register system or from an online retailer. In block 210, the system may confirm that the purchase qualifies for installment repayment. In various embodiments this may comprise confirming that the dollar amount of the purchase is equal to or exceeds a minimum dollar amount of installment purchases. This may be specific to the consumer account or may be universal across all consumers or all groups of consumers. For example, this may be $750, $1000, or other suitable amount greater than routine consumption purchases. Also, this may comprise determining that the purchase is a purchase of a particular product or service or from a particular retailer or vendor that is not excluded for installment repayment. In block 215 one or more repayment plans are determined for the purchase and a confirmation is made that the cardholder's account will support the payment under all of the one or more repayment plans.

In block 220, the one or more repayment scenarios are presented to the consumer. As discussed herein, this may comprise presenting them to a user's computer or at a POS terminal where the consumer is attempting the purchase. In various embodiments, this may include presenting not only the repayment amount for the current purchase, but also for incorporating any existing repayment obligations. In block 225, a selection is made by the user as to which repayment option is desired. In block 230, the transaction is approved. In block 235, as discussed in context of FIG. 2, a statement may be generated and sent to the consumer based on preferences set by the consumer.

Figure 5:
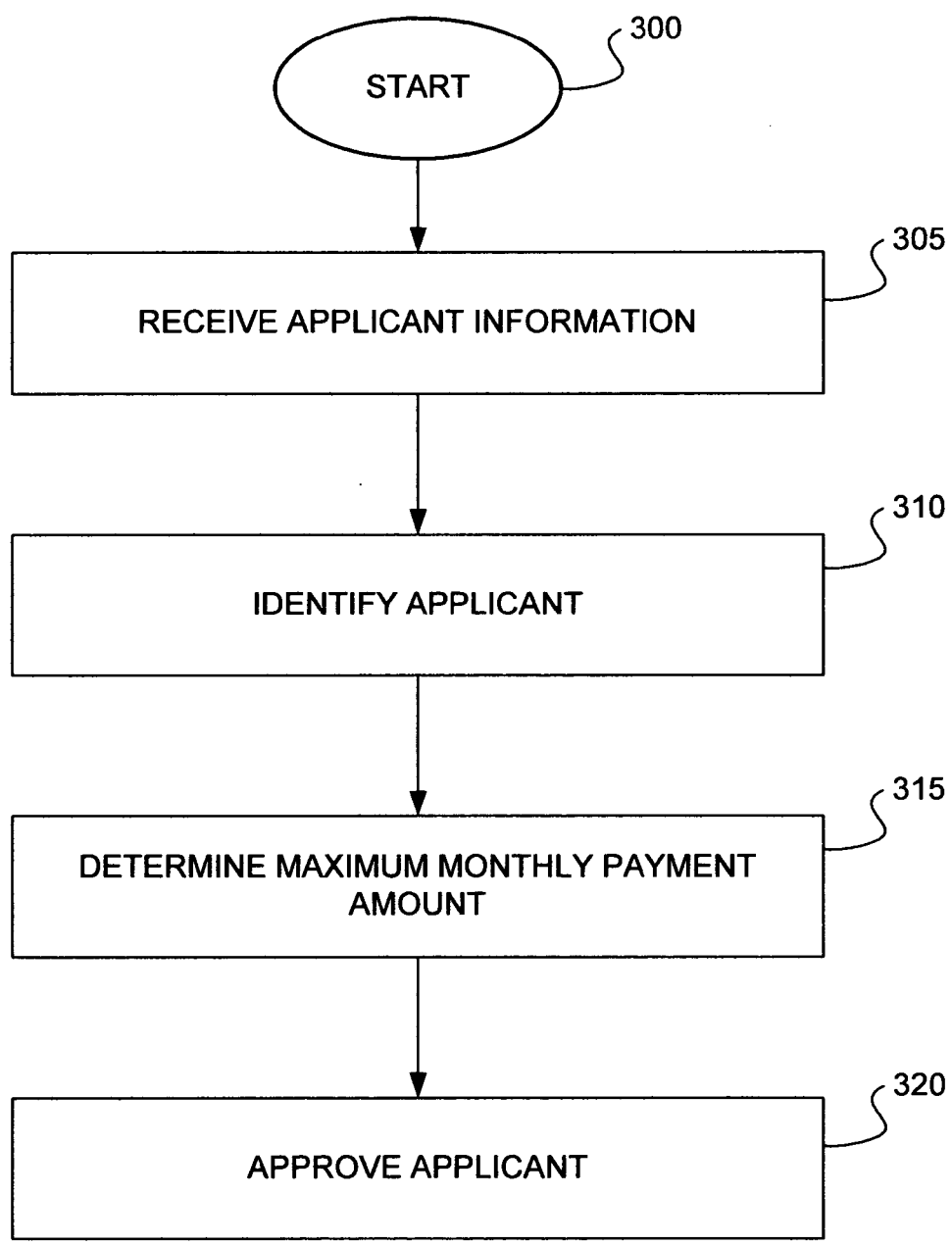
FIG. 5 is a flow chart of an exemplary method for applying for a installment-based credit instrument according to at least one embodiment of the invention.

FIG. 5 is a flow chart of an exemplary method for applying for a installment-based credit instrument according to at least one embodiment of the invention. The method begins in block 300. In block 305 a credit application may be received by the system for the consumer. In a preferred embodiment, this may comprise the user navigating to an application website associated with the installment card issuer and entering information such as name, address, social security number, income, etc.

In block 310, based on the consumer supplied information, the consumer is identified. In various embodiments, this may comprise obtaining a credit record for the consumer based on the consumer's identification. In other embodiments, this may simply comprise confirming that the supplied information matches the information included in the applicant's credit record.

In block 315, the application system may, based on the supplied information and/or information in the consumer's credit record, may determine a maximum monthly payment amount. This is in contrast to most credit card systems which determine a maximum credit limit. The maximum monthly "credit limit" may be allocated by the consumer based on his/her choice of repayment plans. That is, may not be tied to a particular maximum amount of money that can be borrowed, but rather a maximum monthly repayment amount. In various embodiments, the applicant may be prompted to establish a savings account with automatically drawn funds from one of the applicant's other financial accounts. This may be equivalent to the maximum monthly amount of the card or may be a fraction thereof. Also, payments for purchases may be debited from this savings account or paid separately by other means. In block 320, the applicant is approve for the account. This may result in one or more accounts being opened in the applicant's name and one or more cards being issued to the applicant as is well known.

Figure 6:
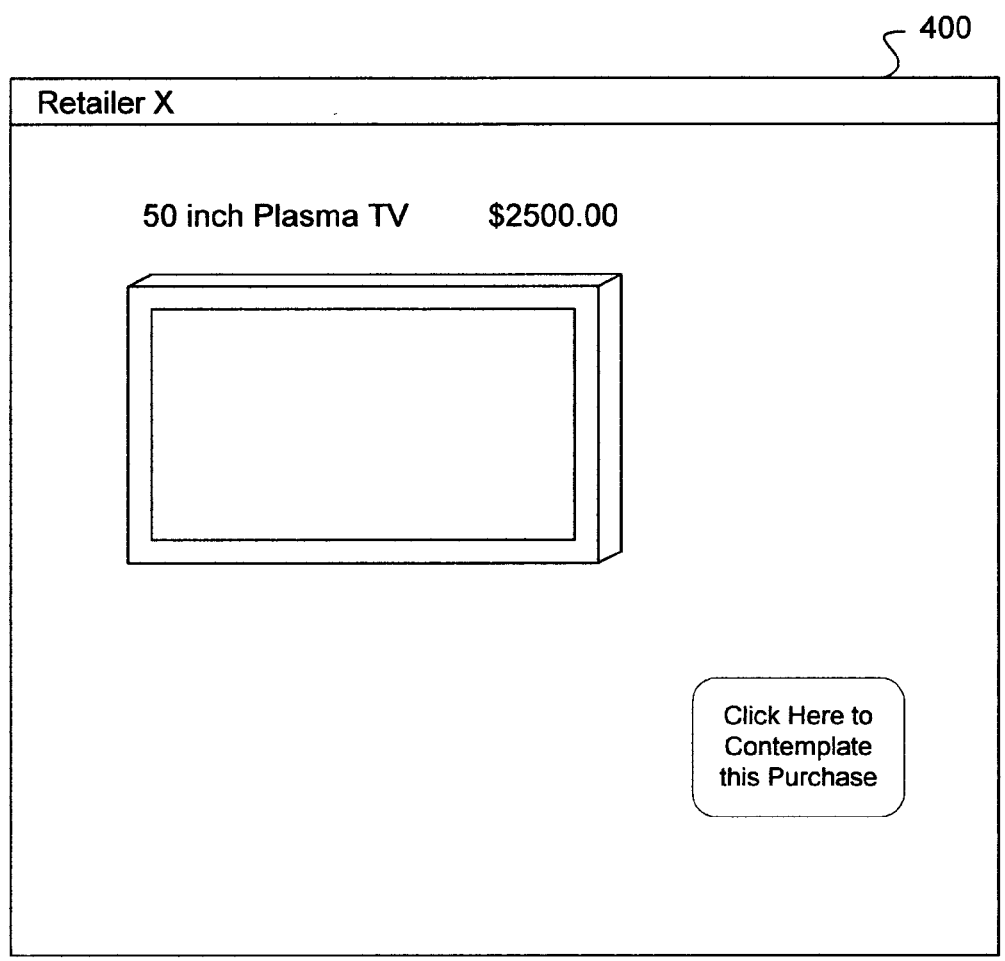
FIG. 6 is an exemplary interface screen of a retailer website including a link to contemplate a purchase decision according to at least one embodiment of the invention.
Figure 7:
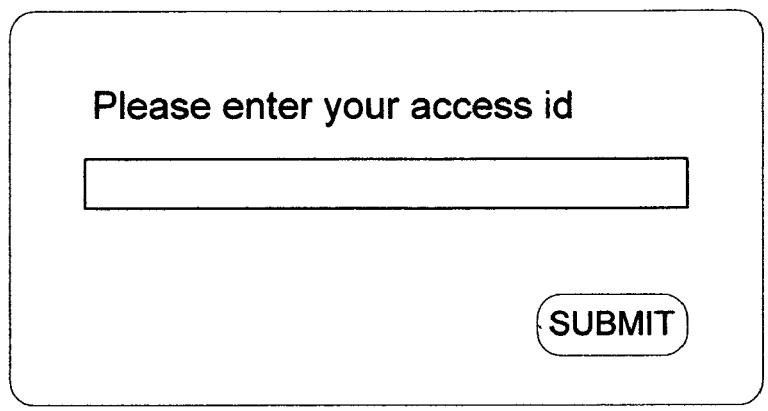
FIG. 7 is an exemplary pop-up interface window according to at least one embodiment of the invention.

FIG. 6 is an exemplary interface screen 400 of a retailer website including a link to contemplate a purchase decision according to at least one embodiment of the invention. In the example of FIG. 6, the consumer has navigated to retailer X's website and is viewing a page describing a 50 inch plasma television that retails for $2500. Brand and other product description information has been intentionally omitted for sake of simplicity. A link 410 embedded in the web page may provide the consumer with an interface to the installment card credit server system 20 (See FIGS. 1 and 2) to contemplate the purchase. In various embodiments, selecting this link will cause the a new browser window to open that is being served by a module of the installment card credit server system 20. In various embodiments, a window such as the exemplary window shown in FIG. 7 will appear, whereby the user will be prompted to enter his/her access id. In various embodiments, because this interface is only used to perform "what if" analysis, that is to contemplate purchases, rather than to make them, less security may be required than in a system in which the cardholder's credit is actually accessible, such as when making purchases. Therefore, the consumer may enter a simple ID such as an email address, phone number name, or other unique id. In fact this information may even be stored in a cookie on the consumer's consumer because of the absence of risk of security breach. That is, additional information would be required to make an actual purchase, such as the card number itself.

Referring now to FIG. 8, this Figure is an exemplary repayment scenario page including a plurality of repayment scenarios for a particular contemplated purchase according to at least one embodiment of the disclosure. As discussed above, when accessing the installment card credit server system 20 via a link on a retailer's website, information such as the dollar amount of a contemplated purchase may be automatically transmitted when the link is submitted using known, automated information linking techniques. In the example of FIG. 8, the consumer is presented with three repayment options: one, two and three years with corresponding payment amounts of $229.17, $115.63 and $77.78 per month respectively. In addition, the user is presented with hyperlinked repayment analysis that incorporates the affect of this contemplated purchase on the consumer's existing repayment obligations under each of the three scenarios. Because of an $100 per month in existing obligations of the consumer on this account, the first repayment scenario would cost the consumer $329.17 per month of the consumer's $500 per month maximum monthly payment limit. The second scenario would cost the consumer $215.63 per month of the consumer's $500 per month maximum monthly payment limit. Finally, the third repayment scenario would cost the consumer $177.78 per month of the consumer's $500 per month maximum monthly payment limit. It should be appreciated that other repayment options than those shown in FIG. 8 may be presented to the consumer. For example, payments may automatically increase after previous obligations are met to speed up repayment, various balloon payment options may be provided, a fastest option may be provided that maximizes the available maximum monthly payment amount, or other repayment options not based on revolving credit typically associated with consumer credit cards.

Figure 9:
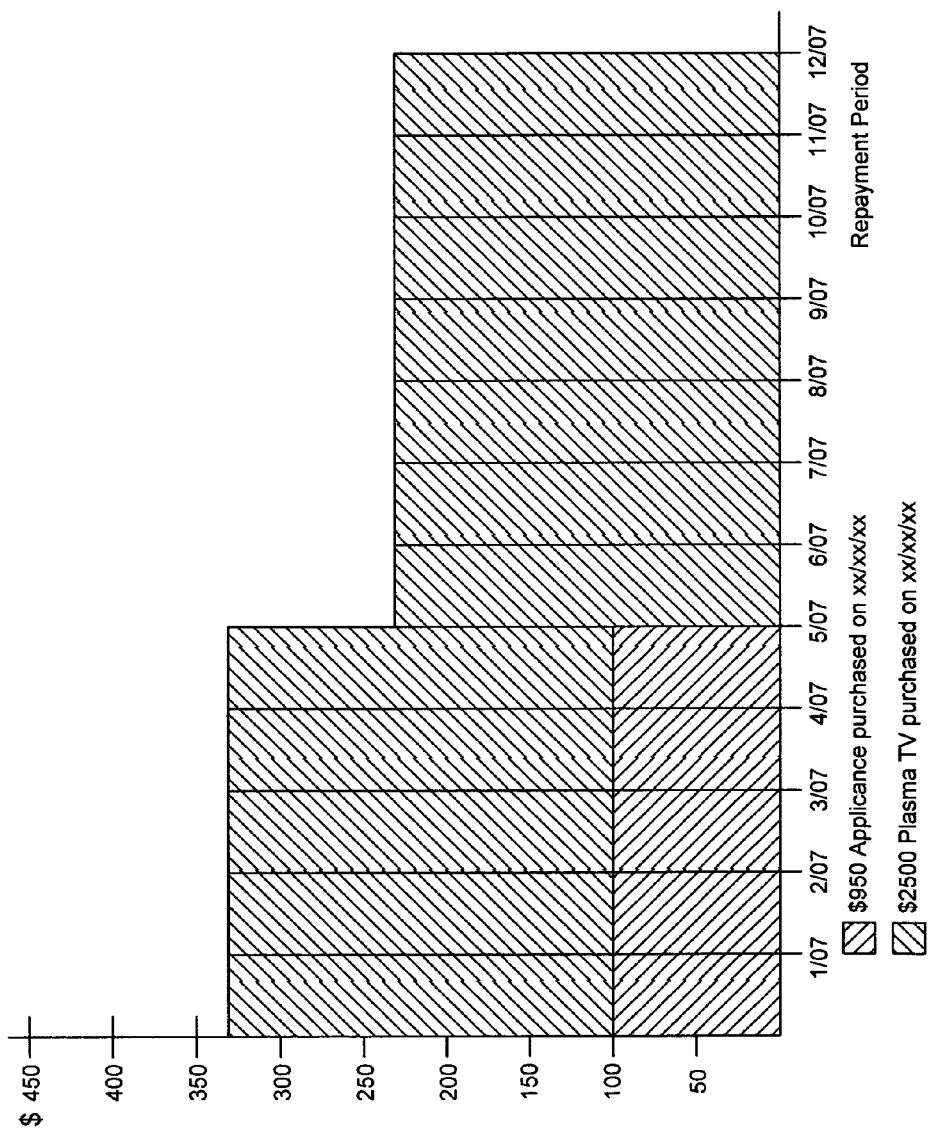
FIG. 9 is a exemplary graph of a repayment plan corresponding to a contemplated purchase including existing financial obligations of the consumer according to at least one embodiment of the invention.

FIG. 9 is a exemplary graph of a repayment plan corresponding to a contemplated purchase including existing financial obligations of the consumer according to at least one embodiment of the invention. The example shown in FIG. 9 illustrates what the consumer may be presented with in response to selecting the "click here" link under the first one year repayment option for the contemplated $2500 plasma TV purchase. As seen in the Figure, the $100 per month existing obligation will be fully met by the end of May 2007. After that, the monthly payment amount responsible by the consumer will drop from $329.17 to $227.17 per month for the remainder of the repayment period, that is until the end of December 2007. In various embodiments, each different purchase will be shown with a different visualization so that the consumer can readily see which portion of his/her payment is attributable to which purchase. In various embodiments, a legend may be provided that explains in greater detail what the purchase was. The legend may be in various embodiments be hyperlinked to a detail page providing even more specific information about the transaction. It should be appreciated that in various embodiments, the user may be presented with different graphics and functionality than that shown in FIGS. 8 and 9 when contemplating a purchase.

Furthermore, in various embodiments, though not shown in the Figures, a user may be able to access the installment card credit server system 20 in order to change the terms of an existing repayment plan. This may require more levels of security than simply contemplating a purchase. For example, the user may be able to select one or more his/her existing repayment obligations and to change the repayment terms of the existing obligations to change the allocation of his/her maximum monthly payment. For example, the consumer may be able to "refinance" an existing obligation over a different repayment period to lengthen or shorten the remaining repayment obligation, subject to the constraints associated with the consumer's account.

The embodiments of the present inventions are not to be limited in scope by the specific embodiments described herein. For example, although many of the embodiments disclosed herein have been described with reference to systems and methods for accelerating sub-pixel interpolation for processor-based motion estimation, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A method of providing information corresponding to a contemplated credit purchase comprising:
    receiving purchase information from a consumer at a centralized data processing system via a network-based account interface, the purchase information comprising at least a purchase price of a contemplated purchase;
    receiving an identification input corresponding to the consumer at the centralized data processing system that uniquely identifies the consumer;
    correlating by a computer the unique identifier to an account associated with the consumer;
    automatically determining if the contemplated purchase qualifies for installment repayment;
    automatically generating by the computer a plurality of installment repayment scenarios corresponding to an installment-based credit account of the consumer with the centralized data processing system, the repayment scenarios based on the purchase price of the contemplated purchase an any existing repayment obligations of the consumer on the credit account corresponding to purchases already made by the consumer; and
    transmitting the plurality of repayment scenarios to the consumer from the centralized data processing system to the network-based account interface.

2. The method according to claim 1, wherein receiving purchase information from a consumer via network-based account interface comprises receiving a hyperlinked request from a user over the Internet from a web page associated with an online retailer, the request including information corresponding to a contemplated purchase.

3. The method according to claim 1, wherein receiving purchase information from a consumer via network-based account interface comprises receiving an electronic request from a retail outlet kiosk, the electronic request including information corresponding to a contemplated purchase.

4. The method according to claim 1, wherein receiving purchase information from a consumer via network-based account interface comprises receiving an electronic request from a retail point of sale terminal, the electronic request including information corresponding to a contemplated purchase.

5. The method according to claim 1, wherein generating at least one repayment scenario comprises generating at least one graphic image illustrating a plurality of repayment options for a contemplated purchase, the repayment options specifying a monthly payment amount that includes any existing repayment obligations owed by the consumer on the credit account.

6. The method according to claim 1, wherein transmitting the plurality of repayment scenarios comprises presenting the user with more than one repayment scenario on a display screen of the network-based account interface.

7. The method according to claim 6, wherein the network-based account interface is selected from the group consisting of a cellular telephone, a personal communication device, a personal digital assistant, a Blackberry, a personal computer, a laptop computer, a retail kiosk, a telephone interface, and a point-of-sale terminal.

8. The method according to claim 1, further comprising receiving a purchase authorization request from a retailer for the consumer to make the contemplated purchase with the credit account associated with the consumer.

9. The method according to claim 8, if the purchase qualifies for installment repayment, and repayment options do not violate a maximum monthly installment repayment amount associated with the consumer's credit account, further comprising presenting the consumer with one or more repayment options corresponding to the purchase at the time of purchase.

10. The method according to claim 9, further comprising receiving a selection of a desired repayment scenario selected by the consumer at a network-based transaction authorization facility and approving the transaction to the retailer.

11. The method according to claim 10, further comprising generating a repayment statement corresponding to the selected terms and including any existing repayment obligations on the consumer's account and sending the repayment statement to the consumer after each new installment purchase transaction.

12. The method according to claim 1, wherein determining if a current purchase qualifies for installment repayment comprises determining if the contemplated purchase exceeds a minimum dollar value.

13. The method according to claim 1, wherein determining if a current purchase qualifies for installment repayment comprises determining if the contemplated purchase type that qualifies for installment repayment.

14. A credit instrument application process comprising: receiving income information from an applicant at a credit application computer server; receiving a social security number from an applicant; automatically performing a credit record check based at least in part on the social security number; and automatically by a computer approving the applicant for a credit instrument having a maximum monthly installment payment limit based at least in part on the income information and existing monthly obligations as evidenced by the credit record check, the credit instrument comprising an installment loan-based credit card configured to permit the applicant to make credit purchases that are repaid on an installment basis.

15. The application process according to claim 14, further comprising requesting, from the applicant, a recurring monthly savings account deposit from an existing financial account of the applicant equivalent to the maximum monthly payment limit, and depositing the recurring deposit in a savings account associated with the applicant.

16. A method for performing online commerce comprising: providing a hyperlink to a credit account server on a web page associated with a product or service sold by a retailer;
    in response to selection of the hyperlink by a consumer, receiving an automated request for a contemplated purchase scenario; at the credit account server computer, the requesting including an indication of an item or service to be purchased and a cost associated with the item or service;
    receiving identification information corresponding to the consumer that uniquely identifies the consumer;
    correlating the consumer to a credit account of the consumer based on the identification information;

confirming that the contemplated purchase exceeds a minimum dollar amount and is not a consumption purchase and therefore qualifies for installment repayment;

automatically generating a plurality of repayment scenarios with the credit account server computer that assume the purchase of the product or service is financed with the credit account, each of the plurality of repayment scenarios providing a simple interest-based monthly payment amount that includes all existing simple interest monthly repayment obligations of the consumer on the credit account for purchases already made by the consumer;

transmitting the plurality of repayment scenarios from the credit account server computer to the consumer in a web browser interface;

receiving a selection of one of the plurality of repayment scenarios from the consumer; and providing a link to return to the web page to purchase the product or service under one of the plurality of repayment scenarios.

17. The method according to claim 16, further comprising, receiving an authorization request to make the contemplated purchase from a seller under the repayment scenario selected by the consumer.

18. The method according to claim 17, further comprising approving the purchase transaction at repayment terms selected by the consumer as long as the selected terms do not result in a monthly payment exceeding a maximum monthly payment allowed on the credit account, taking into account all existing monthly repayment obligations.

* * * * *